(12) United States Patent
Talukdar et al.

(10) Patent No.: US 10,091,812 B2
(45) Date of Patent: Oct. 2, 2018

(54) METHOD AND APPARATUS FOR IMPLEMENTING LOW-LATENCY AND ROBUST UPLINK ACCESS

(71) Applicant: NOKIA SOLUTIONS AND NETWORKS OY, Espoo (FI)

(72) Inventors: Anup Talukdar, Schaumburg, IL (US); Mark Cudak, Rolling Meadows, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 293 days.

(21) Appl. No.: 14/598,003

(22) Filed: Jan. 15, 2015

(65) Prior Publication Data
US 2016/0212765 A1    Jul. 21, 2016

(51) Int. Cl.
H04W 74/00   (2009.01)
H04W 74/08   (2009.01)
H04W 72/04   (2009.01)
H04W 84/18   (2009.01)
H04W 74/06   (2009.01)

(52) U.S. Cl.
CPC ..... *H04W 74/004* (2013.01); *H04W 72/0426* (2013.01); *H04W 74/0833* (2013.01); *H04W 72/0446* (2013.01); *H04W 74/008* (2013.01); *H04W 74/06* (2013.01); *H04W 84/18* (2013.01)

(58) Field of Classification Search
None
See application file for complete search history.

(56) References Cited

U.S. PATENT DOCUMENTS

| 5,594,738 | A    | 1/1997  | Crisler et al. |
| 6,982,968 | B1 * | 1/2006  | Barratt ................. H04W 16/06 370/328 |
| 7,433,336 | B1   | 10/2008 | Hobza |
| 7,873,036 | B2   | 1/2011  | Sreemanthula et al. |
| 8,494,164 | B2   | 7/2013  | Kweon et al. |
| 8,559,393 | B2   | 10/2013 | Brandt et al. |
| 8,879,497 | B2   | 11/2014 | Oizumi et al. |
| 8,913,550 | B2   | 12/2014 | Cordeiro et al. |

(Continued)

FOREIGN PATENT DOCUMENTS

| WO | 2010/090410 A2 | 8/2010 |
| WO | 2013109059 A1  | 7/2013 |

(Continued)

OTHER PUBLICATIONS

U.S. Office Action U.S. Appl. No. 14/597,970 dated Jul. 12, 2016.

(Continued)

*Primary Examiner* — Yaotang Wang
(74) *Attorney, Agent, or Firm* — Squire Patton Boggs (US) LLP

(57) ABSTRACT

A method and apparatus may determine a plurality of access points. The plurality of access points belong to a cluster set of a user device. The method may also include allocating a plurality of uplink access channels to the plurality of access points. The plurality of uplink access channels may include uplink polling channels. The plurality of uplink access channels are allocated such that the plurality of access channels are staggered in time within a frame structure used by the plurality of access points and the user device.

22 Claims, 18 Drawing Sheets

(56) References Cited

U.S. PATENT DOCUMENTS

| | | | |
|---|---|---|---|
| 8,971,247 B2 | 3/2015 | Abraham et al. | |
| 9,191,837 B2 | 11/2015 | Roy et al. | |
| 9,320,023 B2 | 4/2016 | Nory et al. | |
| 2004/0176024 A1 | 9/2004 | Hsu et al. | |
| 2004/0218577 A1 | 11/2004 | Nguyen et al. | |
| 2005/0190701 A1 | 9/2005 | Bejerano et al. | |
| 2005/0285803 A1 | 12/2005 | Iacono et al. | |
| 2007/0060127 A1 | 3/2007 | Forsberg | |
| 2007/0168841 A1 | 7/2007 | Lakkis | |
| 2007/0189247 A1 | 8/2007 | Wang et al. | |
| 2007/0201399 A1* | 8/2007 | Lee | H04W 72/1284 370/329 |
| 2008/0072047 A1 | 3/2008 | Sarikaya et al. | |
| 2008/0137605 A1 | 6/2008 | Berg | |
| 2008/0192707 A1 | 8/2008 | Xhafa et al. | |
| 2009/0088182 A1 | 4/2009 | Piersol et al. | |
| 2009/0094680 A1 | 4/2009 | Gupta et al. | |
| 2009/0122782 A1 | 5/2009 | Horn et al. | |
| 2009/0232105 A1 | 9/2009 | Kesselman et al. | |
| 2009/0232106 A1 | 9/2009 | Cordeiro et al. | |
| 2009/0316629 A1 | 12/2009 | Singh et al. | |
| 2010/0069064 A1* | 3/2010 | Hannu | H04W 72/005 455/434 |
| 2010/0093351 A1 | 4/2010 | Barrett et al. | |
| 2010/0296401 A1 | 11/2010 | Karaoguz et al. | |
| 2011/0038356 A1 | 2/2011 | Bachrach | |
| 2011/0075636 A1 | 3/2011 | Blomgren et al. | |
| 2011/0126271 A1 | 5/2011 | Kim et al. | |
| 2011/0319084 A1 | 12/2011 | Meshkati et al. | |
| 2012/0127970 A1 | 5/2012 | Gupta et al. | |
| 2012/0202490 A1 | 8/2012 | Szufarska et al. | |
| 2012/0320881 A1 | 12/2012 | Hong et al. | |
| 2013/0155847 A1 | 6/2013 | Li et al. | |
| 2013/0182652 A1 | 7/2013 | Tong et al. | |
| 2013/0293412 A1 | 11/2013 | Appleford et al. | |
| 2013/0316730 A1 | 11/2013 | Ding | |
| 2013/0329623 A1 | 12/2013 | Koskela et al. | |
| 2014/0004898 A1* | 1/2014 | Yu | H04W 72/0413 455/510 |
| 2014/0044088 A1 | 2/2014 | Nogami et al. | |
| 2014/0112169 A1 | 4/2014 | Zhou et al. | |
| 2014/0153415 A1 | 6/2014 | Choudhury et al. | |
| 2014/0198723 A1 | 7/2014 | Gong et al. | |
| 2014/0220994 A1 | 8/2014 | Calvanese Strinati et al. | |
| 2014/0269654 A1 | 9/2014 | Canpolat et al. | |
| 2014/0286321 A1 | 9/2014 | Balian et al. | |
| 2014/0328254 A1 | 11/2014 | Lim | |
| 2015/0040195 A1 | 2/2015 | Park et al. | |
| 2015/0049623 A1* | 2/2015 | Yuk | H04W 36/30 370/252 |
| 2015/0124774 A1 | 5/2015 | Kaushik et al. | |
| 2015/0172988 A1 | 6/2015 | Lai et al. | |
| 2015/0189561 A1 | 7/2015 | Dayanandan et al. | |
| 2015/0244486 A1 | 8/2015 | Liang et al. | |
| 2015/0263785 A1* | 9/2015 | Farrokhi | H04B 3/54 375/257 |
| 2015/0289147 A1 | 10/2015 | Lou et al. | |
| 2016/0044733 A1 | 2/2016 | Soriaga et al. | |
| 2016/0154722 A1 | 6/2016 | Petrick et al. | |
| 2016/0157225 A1 | 6/2016 | Joshi et al. | |
| 2016/0191132 A1 | 6/2016 | Rajagopal et al. | |
| 2016/0212685 A1 | 7/2016 | Talukdar et al. | |
| 2016/0212741 A1 | 7/2016 | Talukdar et al. | |
| 2016/0212765 A1 | 7/2016 | Talukdar et al. | |

FOREIGN PATENT DOCUMENTS

| | | |
|---|---|---|
| WO | 2014/009246 A1 | 1/2014 |
| WO | 2014/009250 A1 | 1/2014 |

OTHER PUBLICATIONS

Mohammad Naghibi et al., "Characterizing the Performance of Beamforming WiFi Access Points", 39th Annual IEEE Conference on Local computer Networks, 2014, pp. 434-437.

International Search Report application No. PCT/EP2015/081003 dated Jun. 24, 2016.

U.S. Office Action U.S. Appl. No. 14/597,987 dated Aug. 5, 2016.

U.S. Office Action U.S. Appl. No. 14/597,994 dated Aug. 30, 2016.

Toni Levanen et al., "Radio Interface Design for Ultra-Low Latency Millimeter-Wave Communications in 5G Era", Globecom 2014 Workshop—Ultra-Low Latency and Ultra-High Reliability in Wireless Communications, Dec. 2014, pp. 1420-1426.

Cudak et al., "Moving Towards Mmwave-Based Beyond-4G (B-4G) Technology", in Proc. IEEE VTC-Spring 2013, Jun. 2-5, 2013, pp. 1-5.

Talukdar et al., "Handoff Rates for Millimeterwave 5G Systems", in Proc. IEEE VTC-Spring 2014, May 18-21, 2014, pp. 1-5.

Cudak et al., "Experimental Mmwave 5G Cellular System", Dec. 8, 2014, pp. 1-5.

Singh S. et al: "Blockage and directivity in 60 GHz wireless personal area networks: from cross-layer model to multihop MAC design"; IEEE Journal on Selected Areas in Communications; IEEE Service Center, Piscataway, US; vol. 27, No. 8; Oct. 1, 2009 (Oct. 1, 2009), pp. 1400-1413; XP011277426; ISSN: 0733-8716; DOI: 10.1109/JSAC.2009.091010; p. 1, col. 1, line 3; p. 3, col. 2, line 1-line 21, figure 6.

In Keun Son et al: „On frame-based scheduling for directional mmWave WPANs; Inocom, 2012 Proceedings IEEE; IEEE,; Mar. 25, 2012 (Mar. 25, 2012); pp. 2149-2157; XP032178959; DOI: 10.1109/INFCOM.2012.6195598; ISBN: 978-1-4673-0773-4; p. 1, col. 2, line 14-line 19; p. 2, col. 2, line 27-line 30; p. 3, col. 1, line 15—col. 2, line 4, figure 2.

International Search Report application No. PCT/EP2015/081003 dated Mar. 17, 2016.

* cited by examiner

Table 1 Uplink data arrival at queue and RACH usage

| Data arrival in uplink queue | RACH slot to be used by the UD |
|---|---|
| During subframe 1-10 | In subframe 11 of AP1 |
| During subframe 11-20 | in subframe 21 of AP2 |
| During subframe 21-30 | In subframe 31 of AP3 |
| During subframe 31-40 | In subframe 1 of AP0 |

Fig. 5

METHOD AND APPARATUS FOR IMPLEMENTING LOW-LATENCY AND ROBUST UPLINK ACCESS

BACKGROUND

Field

Embodiments of the invention relate to implementing low-latency and robust uplink access.

Description of the Related Art

5th Generation mobile networks is a standard for wireless communication that seeks to provide improved speed and capacity for wireless communications by using new modulation/signal processing techniques. The standard may be the next major phase of mobile communication beyond the current standards.

SUMMARY

According to a first embodiment, a method may include determining, by a network element, a plurality of access points. The plurality of access points belong to a cluster set of a user device. The method may also include allocating a plurality of uplink access channels to the plurality of access points. The plurality of uplink access channels comprise uplink polling channels. The plurality of uplink access channels are allocated such that the plurality of uplink access channels are staggered in time within a frame structure used by the plurality of access points and the user device.

In the method of the first embodiment, the frame structure comprises a 5G mmWave frame structure.

In the method of the first embodiment, the allocating the plurality of uplink access channels to be staggered in time comprises allocating the uplink access channels to correspond to different times.

In the method of the first embodiment, the determining the plurality of access points comprises determining by an uplink-access channel configurator.

In the method of the first embodiment, the allocating the plurality of uplink access channels comprises allocating user-specific dedicated uplink polling channels.

In the method of the first embodiment, the allocating the plurality of uplink access channels comprises performing an allocation satisfying an m-blockage safe property, and the m-blockage safe property corresponds to a property where the user device can overcome blockages of up to m access points in at most m+1 consecutive uplink access attempts.

In the method of the first embodiment, the allocating the plurality of uplink access channels comprises performing a standby allocation at the instant $T_l^{i_l}$ in a resulting sequence, if $i_l = i_{l-2}$, and the standby allocation $T_l^{s_l}$ is performed in access point $AP_{s_l}$, where $s_l \in \{0, 1, \ldots N-1\} - \{i_l, i_{l-1}\}$.

According to a second embodiment, an apparatus may include at least one processor. The apparatus may also include at least one memory including computer program code. The at least one memory and the computer program code may be configured, with the at least one processor, to cause the apparatus at least to determine a plurality of access points. The plurality of access points belong to a cluster set of a user device. The apparatus may also be caused to allocate a plurality of uplink access channels to the plurality of access points. The plurality of uplink access channels comprise uplink polling channels. The plurality of uplink access channels are allocated such that the plurality of uplink access channels are staggered in time within a frame structure used by the plurality of access points and the user device.

In the apparatus of the second embodiment, the frame structure comprises a 5G mmWave frame structure.

In the apparatus of the second embodiment, the allocating the plurality of uplink access channels to be staggered in time comprises allocating the uplink access channels to correspond to different times.

In the apparatus of the second embodiment, the determining the plurality of access points comprises determining by an uplink-access channel configurator.

In the apparatus of the second embodiment, the allocating the plurality of uplink access channels comprises allocating user-specific dedicated uplink polling channels.

In the apparatus of the second embodiment, the allocating the plurality of uplink access channels comprises performing an allocation satisfying an m-blockage safe property, and the m-blockage safe property corresponds to a property where the user device can overcome blockages of up to m access points in at most m+1 consecutive uplink access attempts.

In the apparatus of the second embodiment, the allocating the plurality of uplink access channels comprises performing a standby allocation at the instant $T_l^{i_l}$ in a resulting sequence, if $i_l = i_{l-2}$, and the standby allocation $T_l^{s_l}$ is performed in access point $AP_{s_l}$, where $s_l \in \{0, 1, \ldots N-1\} - \{i_l, i_{l-1}\}$.

According to a third embodiment, a computer program product may be embodied on a non-transitory computer readable medium. The computer program product may be configured to control a processor to perform the method of the first embodiment.

According to a fourth embodiment, a method may include receiving, by a user device, information relating to an uplink-access channel allocation that has been allocated to a plurality of access points. The uplink-access channel allocation may comprise an allocation of uplink polling channels, and the plurality of access points belong to a cluster set of the user device. The method may also include transmitting an uplink request via an earliest uplink-access channel allocation after arrival of data in an uplink queue of the user device.

In the method of the fourth embodiment, the uplink-access channels of the allocation are user-specific dedicated uplink polling channels.

In the method of the fourth embodiment, the transmitting the uplink request comprises transmitting via an earliest uplink access channel which is an uplink polling channel.

In the method of the fourth embodiment, the transmitting the uplink request comprises transmitting via an earliest uplink access channel which is a Random-Access-Channel.

In the method of the fourth embodiment, the method may further include configuring the transmitting to use the best beam for transmitting the uplink request.

According to a fifth embodiment, an apparatus may include at least one processor. The apparatus may also include at least one memory including computer program code. The at least one memory and the computer program code may be configured, with the at least one processor, to cause the apparatus at least to receive information relating to an uplink-access channel allocation that has been allocated to a plurality of access points. The uplink-access channel allocation comprises an allocation of uplink polling channels, and the plurality of access points belong to a cluster set of the apparatus. The apparatus may also be caused to transmit an uplink request via an earliest uplink-access channel allocation after arrival of data in an uplink queue of the apparatus.

In the apparatus of the fifth embodiment, the uplink-access channels of the allocation are user-specific dedicated uplink polling channels.

In the apparatus of the fifth embodiment, the transmitting the uplink request comprises transmitting via an earliest uplink access channel which is an uplink polling channel.

In the apparatus of the fifth embodiment, the transmitting the uplink request comprises transmitting via an earliest uplink access channel which is a Random-Access-Channel.

In the apparatus of the fifth embodiment, the apparatus is further caused to configure the transmitting to use the best beam for transmitting the uplink request.

According to a sixth embodiment, a computer program product may be embodied on a non-transitory computer readable medium. The computer program product configured to control a processor to perform the method of the fourth embodiment.

BRIEF DESCRIPTION OF THE DRAWINGS

For proper understanding of the invention, reference should be made to the accompanying drawings, wherein:

FIG. 5 illustrates arrival times of data in an uplink queue and the corresponding APs used for uplink access.

DETAILED DESCRIPTION

Figure 1:
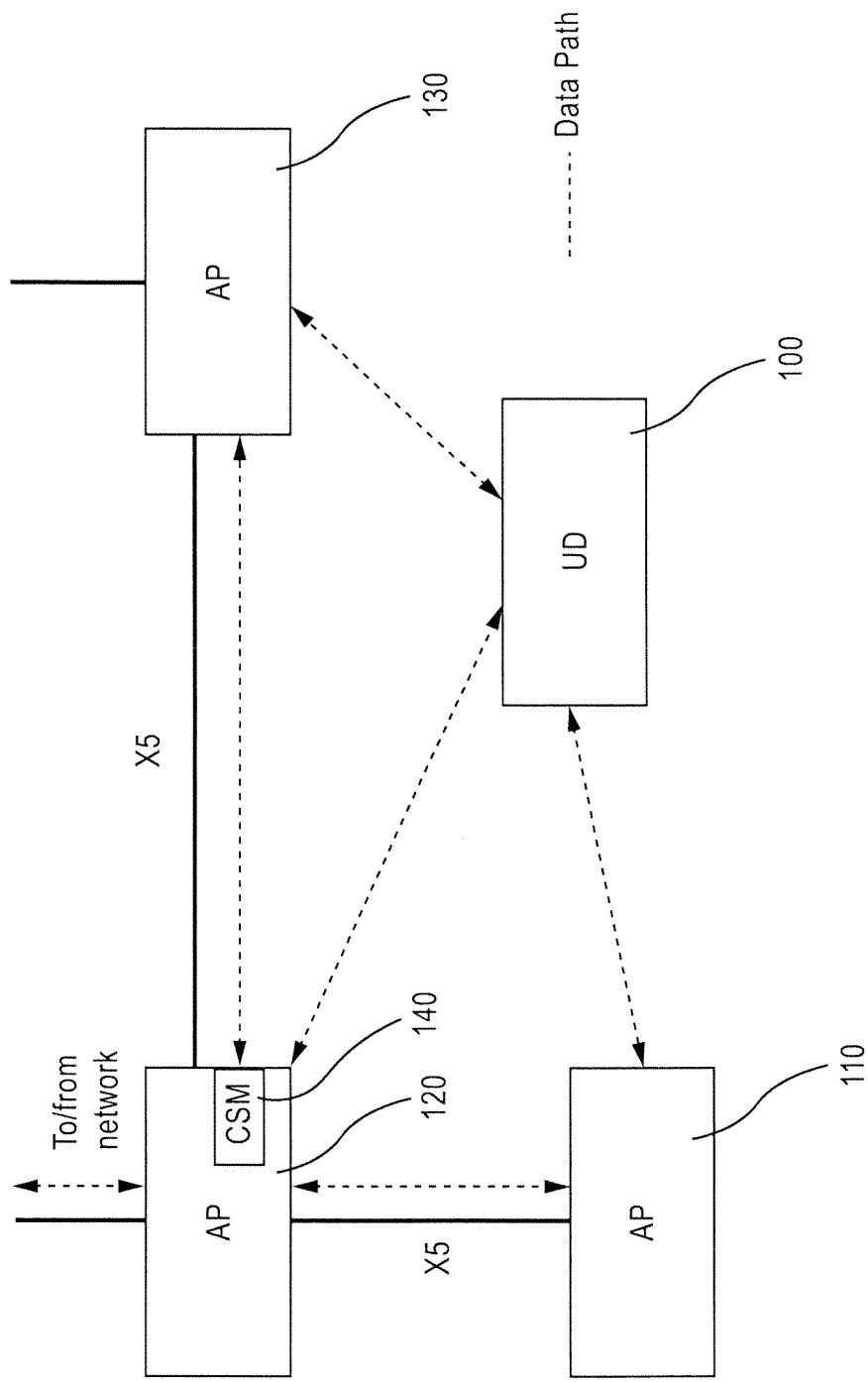
FIG. 1 illustrates a cluster set that includes three APs and a cluster set manager for a user device (UD).

Embodiments of the invention relate to implementing low-latency and robust uplink access. For example, certain embodiments of the present invention may provide low-latency and robust access for 5G wireless networks. 5th Generation (5G) wireless networks are being designed to deliver peak data rates on the order of approximately 10 Gbps, and the target latency requirements have been set to the order of approximately 1 msec. The target latency requirements have been set to such a duration in order to serve applications that have ultra-low latency performance requirements.

Millimeter wave (mmWave) frequency bands have been identified as the bands to be used in conjunction with 5th generation (5G) cellular technology. Spectrum in traditional cellular bands, below 6 GHz, is finite. As cellular data traffic continues to grow, new frequency bands may need to be considered for use. Unlike traditional cellular bands, mmWave bands may allow large blocks of contiguous spectrum to be allocated, allowing for bandwidths on the order of GHz or more. Moreover, the mmWave bands may allow multi-element antenna arrays to be used. Multi-element antenna arrays may comprise very small elements, with sizes on the scale of integrated-circuit (IC) chip elements. Use of these multi-element antenna arrays may provide large antenna gain and sufficient power output through over-the-air power combining. This combination of large bandwidths and device architectures may allow mmWave cellular technologies to provide peak rates on the order of 10 Gbps and to provide ample capacity to meet the future demands.

However, the propagation characteristics within the mmWave band make implementing communication via the mmWave band more challenging than implementing communication via traditional cellular bands. Diffraction within mmWave bands behaves similar to diffraction of visible light. Transmission (within mmWave bands) through most objects generally results in diminished transmission, where foliage and other common obstacles can cause severe shadowing. Reflective power (within mmWave bands), on the other hand, is improved as compared to the reflective power within traditional cellular bands. The improvement of reflective power (within mmWave bands) may offer new opportunities for completing the (communication) link, but the link may be 15 dB-40 dB weaker.

In a typical urban deployment, mmWave access points (AP) may be installed on top of street-side poles, possibly at street corners. Other deployment scenarios may include deployment in stadiums, college campus courtyards, and/or tourist hotspots.

As a result of the shadowing loss characteristics within the mmWave band, the radio link between a user device (UD), and its serving AP, will likely be disrupted if the line-of-sight (LOS) between the UD and the AP is blocked by obstacles. When a pedestrian (with a UD) walks along a sidewalk of a city block, the pedestrian's LOS may be blocked by fixed obstacles (such as trees), or may be blocked by moving obstacles (such as large trucks), or may be blocked by other pedestrians. In a campus courtyard or a tourist hotspot, LOS blocking may be caused by crowds. Other types of LOS blocking may be caused by user motions, such as by hand or body rotations.

In order to deliver reliable connectivity to a user in the presence of obstacles, a mmWave access point network may be built with redundancies of APs. There may be enough redundancy of APs such that, in the event of LOS blocking, the network connection of the UD can be rapidly rerouted via another AP. In such a mmWave access point network, a cluster of access points may be coordinated to provide uninterrupted connectivity to the UD. By using such a cluster of access points, the network may overcome radio-link blockages due to obstacles.

For the above-described network architecture, it may be desirable to provide a method to manage the connectivity between the UD and the overall cluster of APs. Embodiments of the present invention may configure the cluster of APs for the UD.

As described above, each UD in a mmWave network may be served by a cluster of APs. The cluster of APs for a UD may be referred to as the cluster set for the UD. APs may be selected to be members of the cluster set of a UD based on which APs are accessible by the UD.

An AP may be considered to be accessible by a UD if the UD can receive a beacon waveform via the AP. The beacon waveform may be a broadcast beacon or a swept beam beacon, whose reception has a signal-to-noise-ratio (SNR) threshold above a certain threshold. Accessibility information of an AP by a UD may indicate the best transmit and receive beam weights, the antenna polarization (e.g. horizontal, vertical or circular) and the corresponding signal strengths. The best transmit and receive antenna weights would determine the antenna directivity for a multi-element antenna array. The antenna weights can be implemented using either an analog, digital or hybrid implementation. Other implementations of directional antennas could also be supported by this invention. For example, a di-electric lens antenna can focus mmWave energy through diffraction similar to how an optical lens focuses light. The antenna directivity of a di-electric lens antenna is controlled by configuring the switching feed elements.

Among the APs in the cluster set of a UD, one particular AP can be selected as the serving AP for the UD. The network may communicate with the UD through the serving AP. The UD may maintain continuous connectivity with each member of its cluster set by maintaining synchronization with the symbol and frame structure; the UD knows the symbol timing, the starting time of the radio frame and its duration, the timing of the synchronization channel, downlink control channel and uplink control channel. In this embodiment, synchronization may further imply that the UD is not only aware of the individual frame timing of each AP in the cluster set but is also aware of the best accessibility information. The UD may maintain beam synchronization by selecting the best beams for downlink (DL) and uplink (UL) communication with each of the APs in its cluster set; this means the AP may know the transmit (receive) weights for the best beams, the antenna polarization (e.g. horizontal, vertical or circular) for transmission to (reception from) the UD and vice versa.

FIG. 1 illustrates a cluster set that includes three APs (110, 120, and 130) and a cluster set manager (CSM) 140 for a user device (UD) 100. The cluster set of a UD may be configured and managed by a cluster set manager (CSM) 140. There may be a logical instance of a CSM for each UD. The logical instance of the CSM 140 may be located in the network. The location of the CSM may be close to the APs in the cluster set in order to enable low-latency communication with those APs and the UD.

Figure 2:
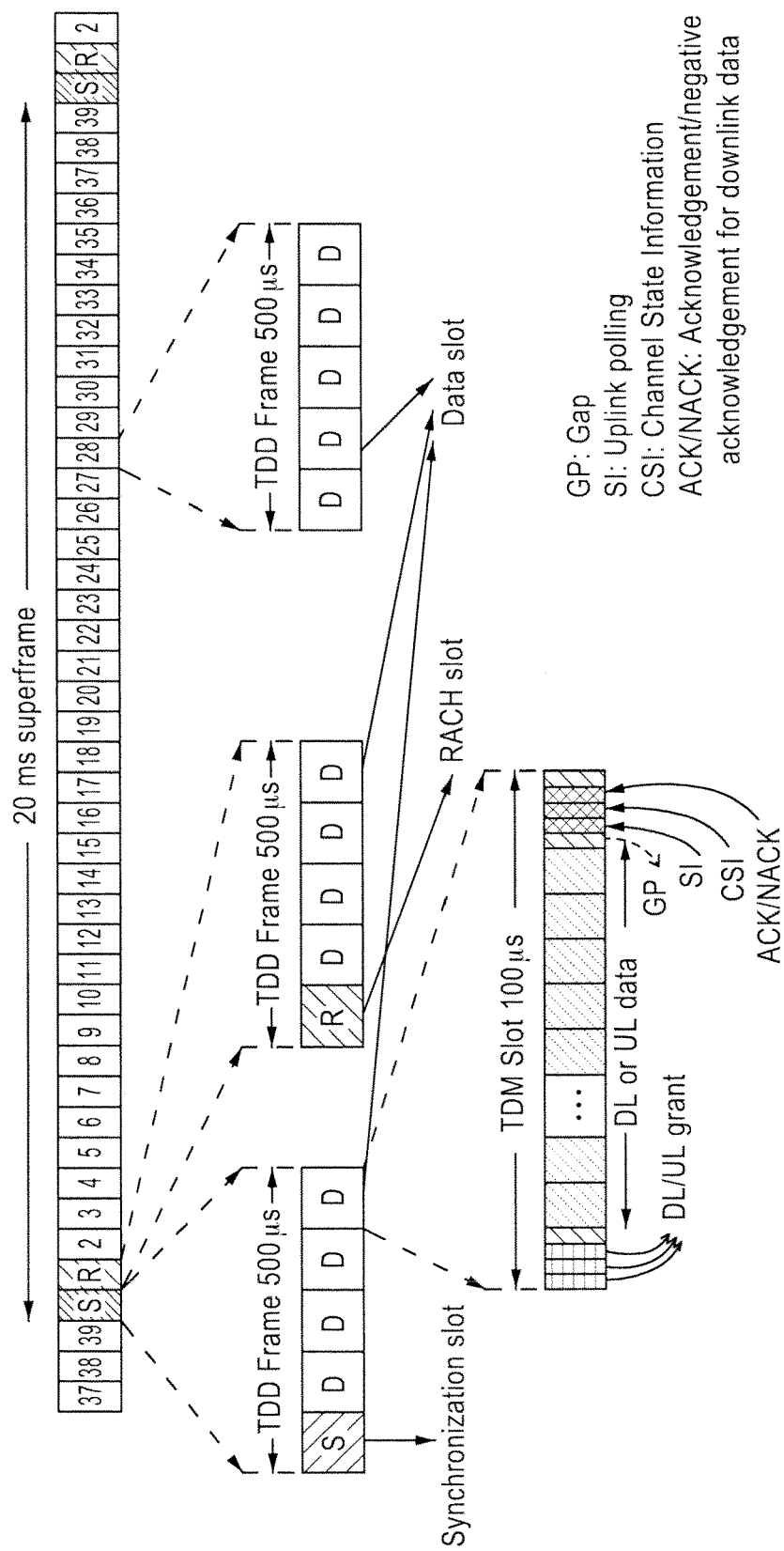
FIG. 2 illustrates a frame structure, in accordance with certain embodiments of the present invention.

FIG. 2 illustrates a frame structure, in accordance with certain embodiments of the present invention. Although FIG. 2 illustrates a millimeter wave 5G frame structure, certain embodiments of the present invention may use other types of frame structures. With this structure, a 20 msec superframe may be subdivided into 40 subframes. Each subframe may have a duration of 500 microseconds. Each subframe may be further divided into 5 slots. Each slot may have a duration of 100 microseconds. A slot can correspond to a synchronization slot (a.k.a. synchronization channel), an uplink random access channel (RACH) slot, or a data slot.

An access point may transmit its synchronization signal over its synchronization slot. The synchronization signal may be used for performing system acquisition and also for performing a UD-specific beam synchronization. A synchronization slot may be allocated every 20 msec. The RACH slot may be used by the UD to send an uplink access request, and the RACH slot can be used by the UD to provide feedback on beam selection. A data slot may contain three segments: a downlink control segment, an uplink control segment, and a data segment. The downlink control segment may be used to communicate the downlink/uplink resource allocations. The uplink control segment can be used for sending automatic repeat request (ARQ) acknowledgement/negative-acknowledgement (ACK/NACK) for downlink data transmissions, channel state information feedback, and/or uplink polling to request uplink resources. The data segment can be used for either downlink or uplink data transmissions as a part of dynamic time-division-duplex (TDD), and the data segment may be determined by the resource allocation in the downlink control channel. User-specific beamforming may be used to communicate over the downlink control segment, uplink control segment, and the data segment.

With regard to cluster set configuration, the UD and the network may determine the cluster set for the UD and may determine the UD's serving AP. Such determinations may be accomplished in various ways. In one embodiment of the present invention, the UD determines the accessible APs and their received signal strengths. In certain embodiments of the present invention, the UD may select a temporary serving AP based on signal strength (for example, the AP with the best signal strength may be selected as the temporary serving AP). The UD may communicate the UD's list of accessible AP to the network via the temporary serving AP. In certain embodiments of the present invention, the network may determine a cluster set for the UD based on the information received by the temporary serving AP, and the network may also select a serving AP. In addition, the network may instantiate a CSM for the UD. The network may inform the UD (of the cluster set and of the serving AP information) via the temporary serving AP. Upon receiving the cluster set and the serving AP information, the UD may perform the following. If the serving AP is not the same as the temporary serving AP, the UD may perform a handover to its designated serving AP. For each AP in its cluster set, the UD may acquire the system information and may maintain synchronization with its symbol and frame structure, and downlink and uplink control channels.

As described above, the uplink-access latency may be determined by the RACH periodicity. A trade-off may exist between the amount of system control overhead and the uplink access latency. The maximum latency can correspond to $T_{RACH}$, where $T_{RACH}$ may be the periodicity of RACH. For example, $T_{RACH}$ may correspond to a duration between successive RACH. The average latency may correspond to $T_{RACH}/2$. In the 5G mmWave frame structure illustrated by FIG. 2, the uplink-access latency may be 20 msec, and the corresponding RACH overhead may be 0.5% (i.e., the overhead may be 1 slot out of every 200 slots).

Figure 3:
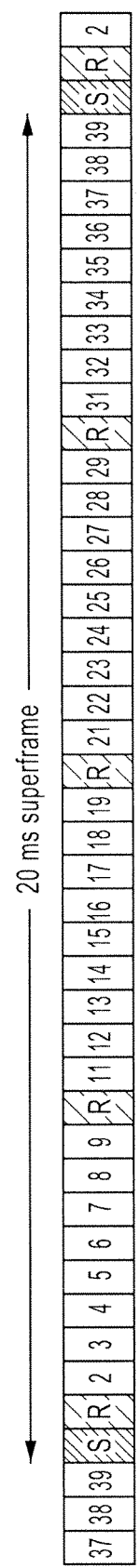
FIG. 3 illustrates reducing uplink-access latency by reducing a random-access-channel periodicity, resulting in a 2% overhead.

FIG. 3 illustrates reducing uplink-access latency by reducing a random-access-channel periodicity, resulting in a 2% overhead. Specifically, FIG. 3 illustrates a 5G mmWave frame structure, where the uplink access latency is reduced to 5 msec (corresponding to a latency reduction of 75%). The latency reduction is achieved by reducing a periodicity of RACH slots (for example, by reducing the duration of time between successive RACH slots). However, by reducing the periodicity of RACH slots, the RACH overhead is increased to 2%.

Although it may be possible to reduce the uplink access latency (by reducing the RACH periodicity) in order to satisfy the desired target requirements for 5G systems, such reduction of RACH periodicity may be impractical due to the resulting high RACH overhead. For example, in order to reduce the uplink access latency (within the above mmWave 5G structure framework) to the target 1 msec duration, the system incurs a corresponding RACH overhead of 10%. This RACH overhead corresponds to 1 slot allocated for RACH for every 2 subframes (where the 2 subframes have a duration of 1 msec). This overhead results in a large degradation in system throughput performance.

In the event that a radio link between the UD and its serving AP is severed/blocked, the UD may possibly not be able to receive any random access response from its serving AP. In the course of performing operations in accordance to the UD's uplink access protocol, the UD may later retry performing the uplink access procedure at the next RACH opportunity (which may occur at intervals of duration $T_{RACH}$). However, all of these repeated uplink access attempts of the UD will generally fail as long as the blockage persists.

The conventional methods of detecting radio-link failure/degradation (by performing measurements of the radio link over a sufficiently long interval) are generally not suitable to meet the target latency requirements of 5G (where the latency may need to be less than or equal to approximately 1 msec).

In view of the above, certain embodiments of the present invention may be directed to a method for uplink access (in a mmWave 5G system, for example) that may reduce the uplink-access latency and may also enable fast uplink access that overcomes radio-link blockages. The method may enable fast-uplink access and may overcome radio-link blockages without resulting in a significant increase of the system control overhead.

Aspects of communication between a user device and a cluster of APs in a mmWave 5G network have been discussed. For example, aspects of managing the cluster sets for a user device in a mmWave 5G network have been addressed. Various scenarios of radio link blockages have been discussed in which rapid rerouting of a user's connection to the network via alternate APs is needed.

Figure 4:
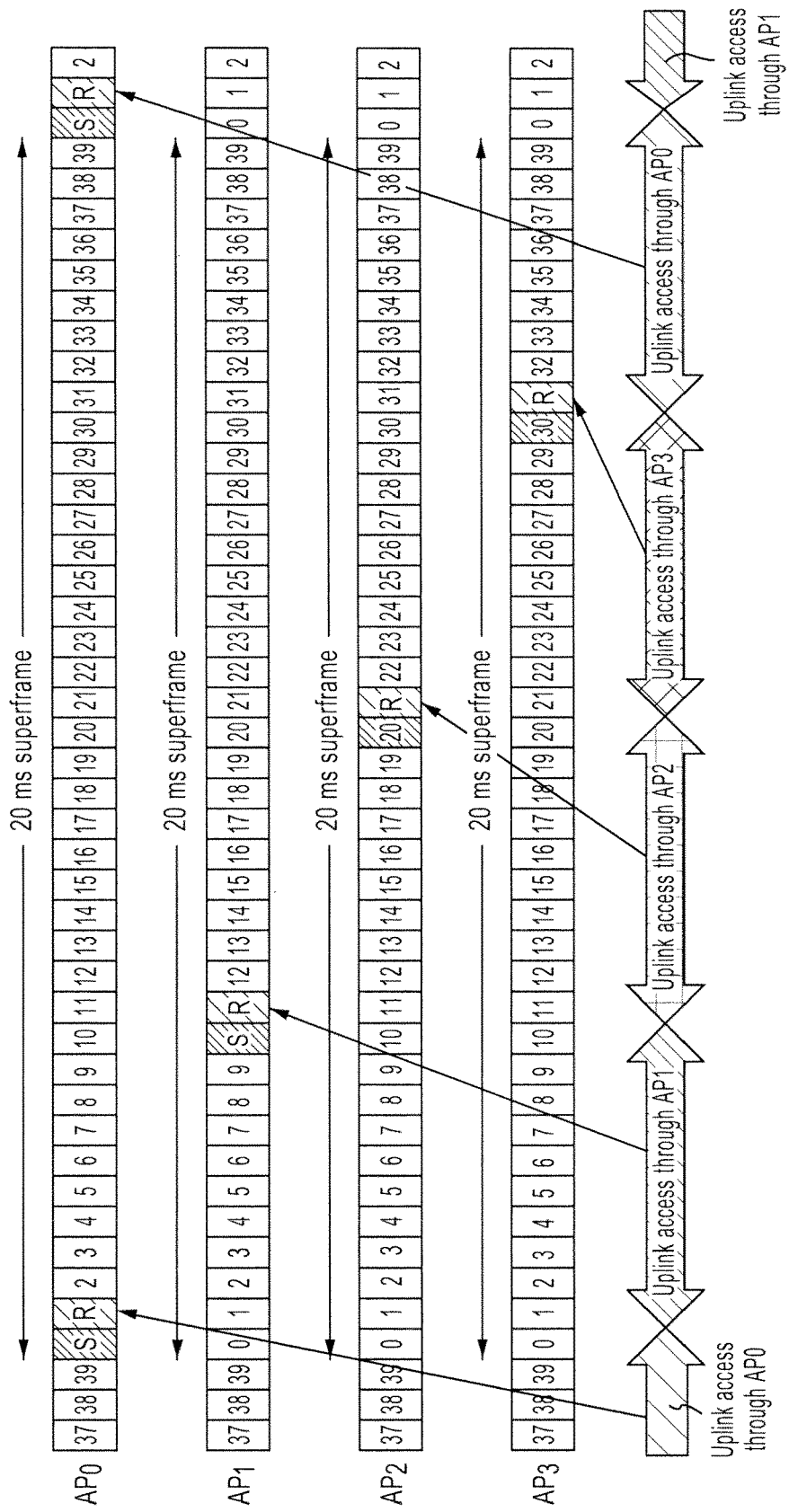
FIG. 4 illustrates an example random-access-channel slot allocation for multiple access points of a cluster set of four APs that reduces uplink access latency and improves robustness.

A method for reducing the uplink access latency and for improving robustness in the presence of a radio-link blockage has been described for a mmWave 5G access network. The RACH slots for the APs (within a cluster set of a UD) may be allocated in such a way that the RACH slots appear staggered in time to the UD. In one embodiment of the present invention, the staggered RACH slots of the different APs in the cluster set may be equally spaced in time within the RACH period/interval ($T_{RACH}$). In order to perform an uplink access over RACH, the UD may use the earliest RACH slot (that corresponds to an AP in the UD's cluster set) which occurs next in time. FIG. 4 illustrates an example RACH slot allocation for a cluster set of four APs.

A diversity of access points (within a mmWave 5G network) may be used to reduce an uplink-access latency for a UD, as described in more detail below.

In methods according to certain embodiments of the present invention, the RACH slots for the APs (within a cluster set of a UD) may be allocated in such a way that the RACH slots appear staggered in time to the UD. In one embodiment of the present invention, the staggered RACH slots of the different APs in the cluster set may be equally spaced in time within the RACH period/interval ($T_{RACH}$). With one example embodiment, this allocation may be further described below.

Suppose a cluster $C_s$ of a UD contains N APs where: $C_s = \{AP_0, AP_1, \ldots, AP_{N-1}\}$ Suppose, $T_{RACH}$=periodicity of RACH in each AP, and $T_s$=the duration of a slot. Then, $N_s$=Number of slots in the RACH period=$T_{RACH}/T_s$. Assume that the successive slots in a RACH period are numbered 0, 1, . . . , $N_s$-1.

Suppose $s_0$ corresponds to the slot number of the RACH slot for $AP_0$. For RACH allocation purposes, the successive slots in each RACH period may be numbered 0, . . . , Ns−1 (there are Ns slots in the RACH period).

Then, the RACH slots for $AP_i$, i=1, . . . , N−1, may be allocated such that, $s_i$=slot number of RACH slot for $AP_i$= $[s_0+(N_s/N)*i]$ mod $N_s$.

In order to perform an uplink access over RACH, the UD may use the earliest RACH slot (that corresponds to an AP in the UD's cluster set) which occurs next in time. The access point and the RACH slot to be used can be determined as follows.

Suppose t=time instant when data arrives at the uplink queue. Then, the corresponding slot number can correspond to $$s = \left\lfloor \frac{t}{T_s} \right\rfloor \bmod N_s.$$

The UD may then send the uplink access request to the $AP_k$, 0≤k<N, where $$k = \left\lceil \frac{(s + 1 - s_0) \bmod N_s}{(N_s/N)} \right\rceil$$

in slot s', where s'=$(s_0+k*N_s/N))$ mod $N_s$

FIG. 4 illustrates implementing low-latency and robust uplink access using an access point cluster. Specifically, FIG. 4 illustrates the above-described uplink access procedure, for a UD with a cluster set containing four APs.

Referring to FIG. 4, the RACH periodicity may be 20 msec for each of the access points $AP_0$, $AP_1$, $AP_2$ and $AP_3$. The RACH slots for the APs may be allocated in sub-frame (10×i+1) of $AP_i$, i=0, 1, 2, 3 (Without a loss of generality, the first slot of the subframe may be used as the RACH slot). Arrival times of data in the uplink queue (within the UD), to be used for uplink access, are described in FIG. 5.

In the event that the radio link between the UD and the AP (via which a RACH preamble is to be transmitted by the UD) is blocked, the UD will use the next earliest available RACH slot to send an uplink access request. For example, if data arrives in an uplink buffer in the subframe interval 1-10, and if the radio link between the UD and $AP_1$ is blocked, then the UD will use the RACH slot in subframe 21 to send the uplink access request to $AP_2$.

The determining of RACH slot allocation across multiple access points (for implementing the above-described uplink access scheme) can be performed when configuring the cluster set of the UD or when configuring the deployment network.

Figure 11:
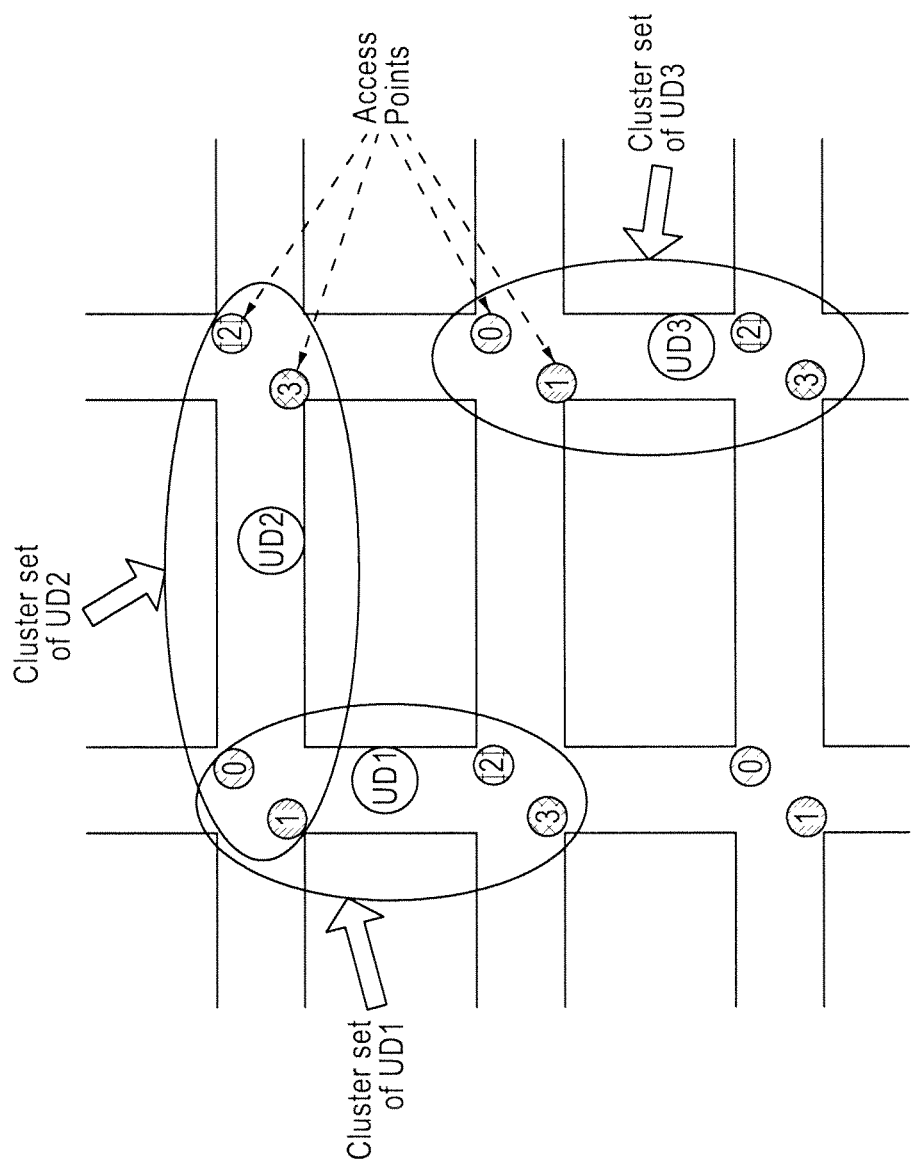
FIG. 11 illustrates utilizing cluster sets in an example urban deployment, in accordance with certain embodiments of the present invention.

FIG. 11 illustrates utilizing cluster sets in an example urban deployment. FIG. 11 illustrates the cluster sets for three user devices UD1, UD2 and UD3. At any location, the cluster set of each user device may include four APs. The numbering of the APs may correspond to the RACH slot allocation, as illustrated by FIG. 4.

In view of the above, the steps for implementing certain embodiments of the present invention are described below. With regard to RACH slot configuration, a network entity (such as a RACH slot configurator, for example) may allocate the RACH slots of the access points. The RACH slots may be allocated to the access points (within a cluster set for a UD) such that the RACH slots are staggered in time, as previously described.

With regard to cluster set acquisition, the UD may acquire its cluster set information from the network and may then acquire system information for each of the APs in its cluster set. The system information of a given AP may include the RACH slot location (in time) for the AP.

FIG. 5 illustrates a table of arrival times of data in accordance with certain embodiments of the present invention. Specifically, the arrival time of data in the uplink queue (of a UD) and the corresponding AP used for uplink access may be described in Table 1 of FIG. 5.

The above-described methods have certain technical deficiencies. First, in order to meet the low-latency requirements for 5G services (requirements such as a 1 msec uplink-access target latency, for example), the RACH overheads in each access point will be high. For example, for a cluster set containing four APs, a RACH slot may need to be allocated every 4 msec (i.e., allocated once every 40 slots) in each AP. Such an allocation has a corresponding overhead of 2.5%. If only a limited number of users require low latency uplink access, such allocations waste radio resources.

Figure 6:
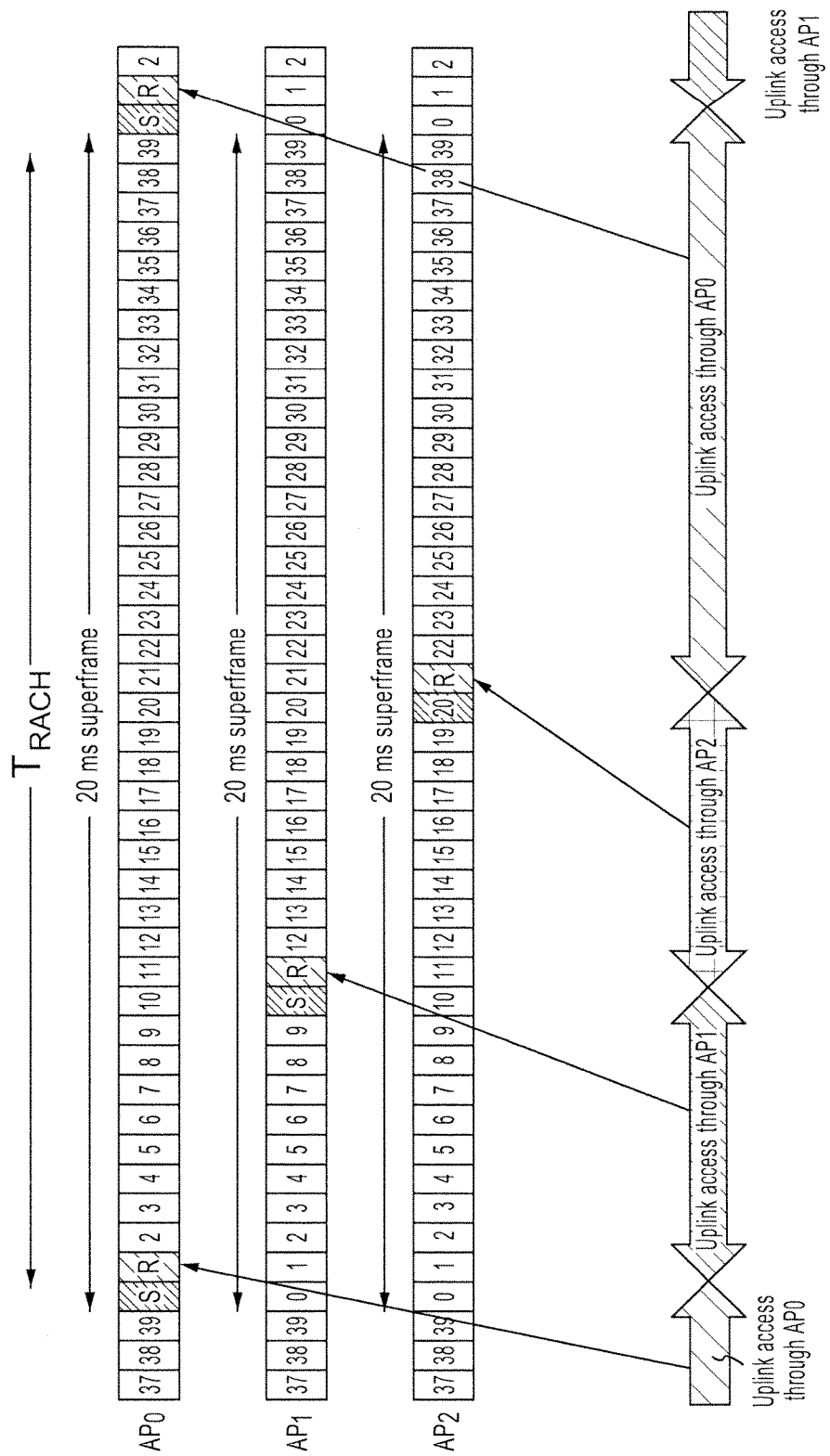
FIG. 6 illustrates a scenario where intervals between successive random-access channel slots are irregular.

Secondly, in certain deployment scenarios, the RACH slot allocations of the above-described method are configured such that intervals between successive RACH slots in the cluster are irregular and do not always meet the low-latency uplink access requirements. This situation may arise in a scenario when an AP in the cluster set fails or goes out of bounds (of a UD) for an extended period of time. FIG. 6 illustrates a scenario where intervals between successive Random-Access Channel slots are irregular. In this example, AP3 is not accessible to the UD. Hence, UD can access the RACH slots of only three APs (AP0, AP1 and AP2). These types of irregular uplink access intervals may arise in certain other deployment scenarios where the cluster sets for different locations of the UD are not disjoint.

Figure 7:
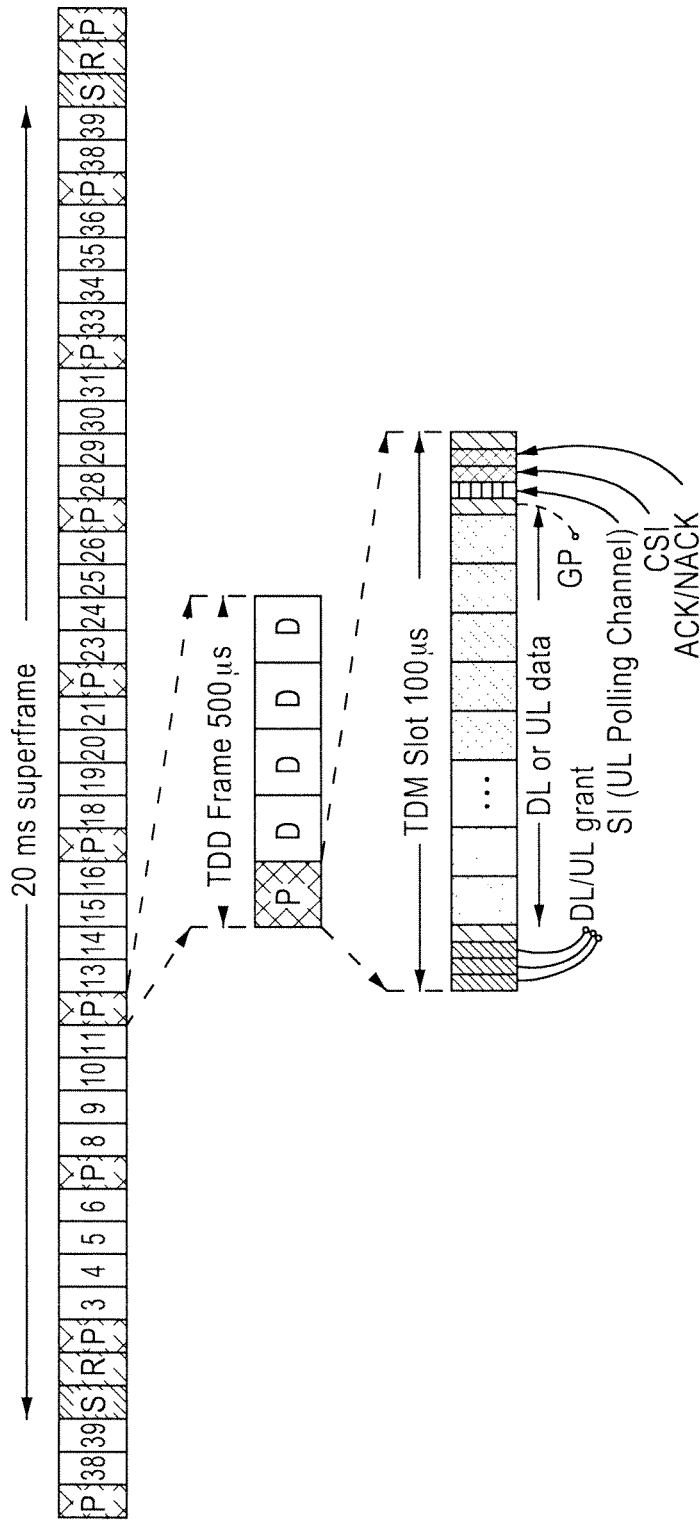
FIG. 7 illustrates uplink polling channel allocation for a user device.

According to certain embodiments of the present invention, as an alternative to using the RACH slot to send an uplink resource request, a UD-specific uplink polling opportunity (such as a UL polling channel, for example) can be allocated for a user that requires low-latency uplink access. These uplink polling opportunities may be allocated by an AP via the uplink control segment/region of a slot. The uplink polling opportunities typically occupy one or half a symbol duration. Using the uplink polling channel for a given UD, the AP can listen to the given UD by configuring a receiver beam to do so. One embodiment of the present invention may perform allocating of the polling channel for a UD at the UD's serving AP, at the desired interval, as shown in FIG. 7. FIG. 7 illustrates uplink polling channel allocation for a UD.

Referring to FIG. 7, when the radio link between the UD and its serving AP is blocked, uplink access may fail. Robust-uplink access (in the presence of radio-link blockage events) can be achieved using a diversity of APs. The APs (of a UD's cluster set) can allocate/distribute polling channels for the UD in a staggered manner.

Figure 8:
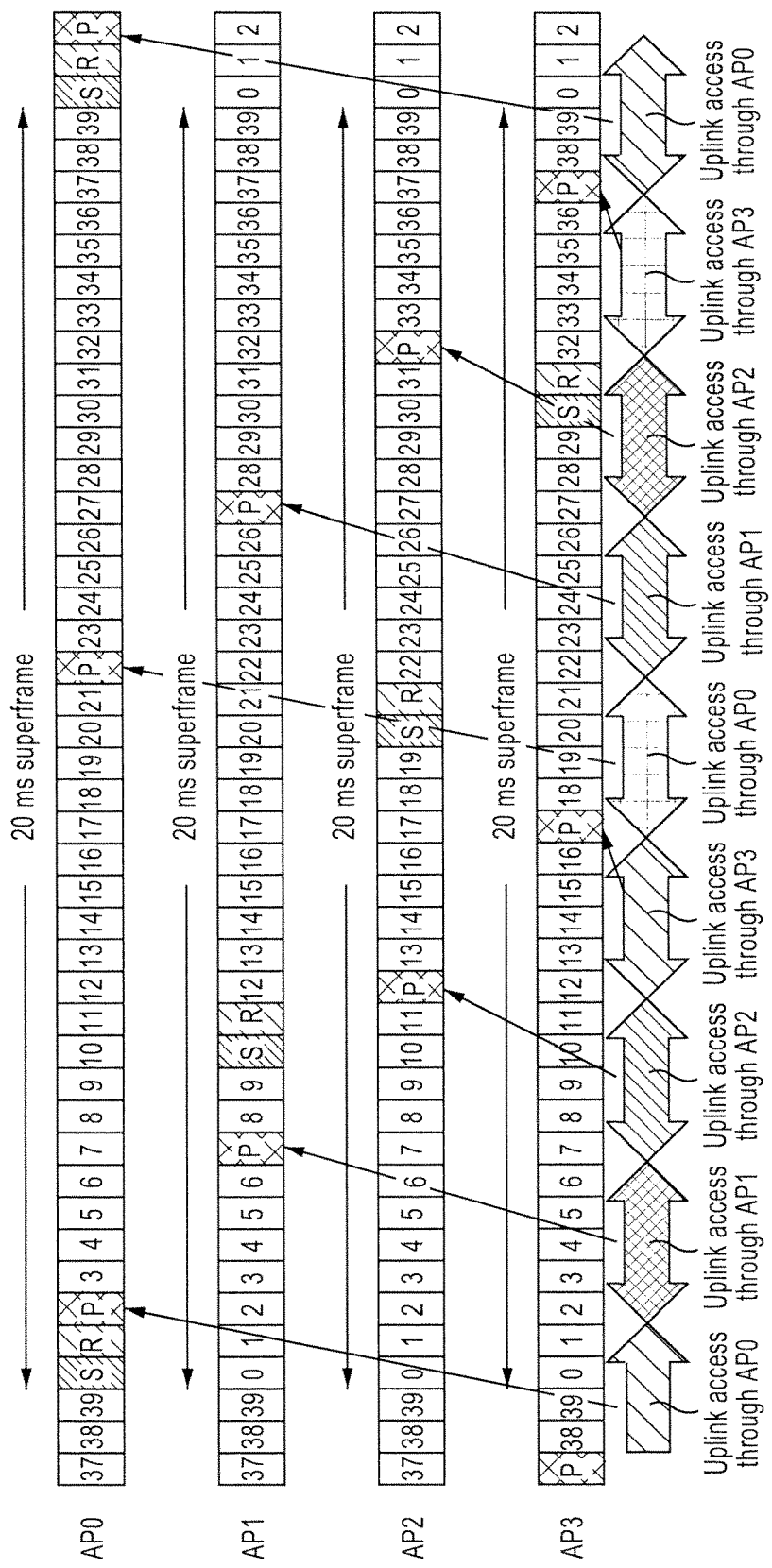
FIG. 8 illustrates an example allocation in accordance with certain embodiments of the present invention.

FIG. 8 illustrates an example allocation in accordance with certain embodiments of the present invention. In this method, a polling channel allocation for a UD may be coordinated among the APs in the cluster set of the UD. It may be possible to reduce uplink-access latency and to achieve robustness by distributing the allocation of the uplink polling channels among the APs in the cluster set of the UD.

Figure 9:
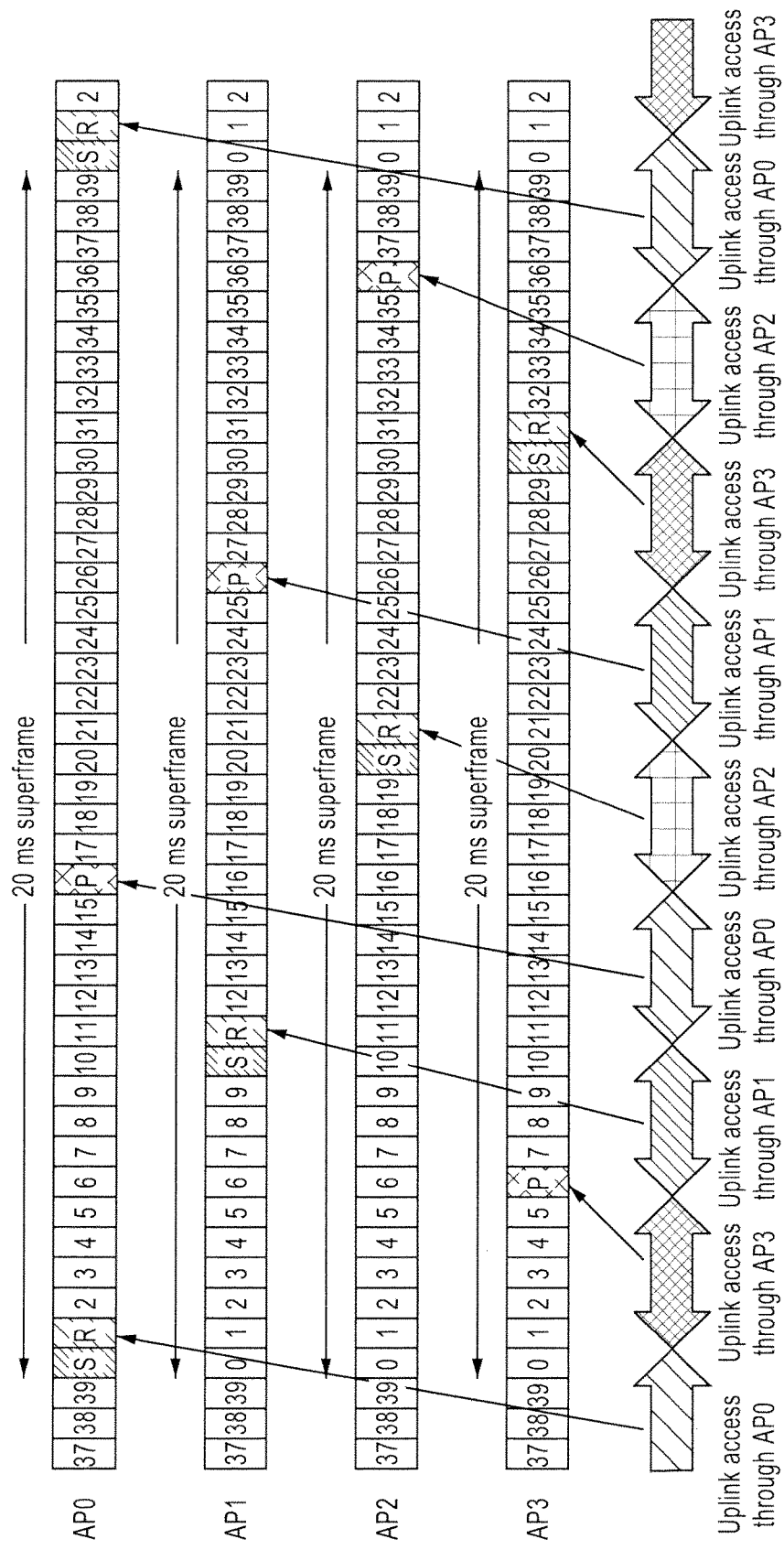
FIG. 9 illustrates reducing the uplink-access latency by half in accordance with certain embodiments of the present invention.

FIG. 9 illustrates an example deployment in accordance with certain embodiments of the present invention. With this example deployment, the UD may use either the RACH or the polling channel to send an uplink resource request. The UD will determine which RACH/polling channel to use depending on the arrival time of data (for the uplink resource request) in the uplink queue (of the UD), whichever RACH/polling channel appears earlier in time. Using this method, the same latency and robustness performance (as illustrated by FIG. 8) may be achieved, while using only 50% of the UL polling channel allocation as compared to method of FIG. 8. Such a savings can be a significant saving when a large number of UDs require low-latency UL access.

FIG. 9 illustrates reducing the uplink-access latency by half in accordance with certain embodiments of the present invention. Specifically, FIG. 9 illustrates reducing the uplink-access latency by inserting a UL polling channel between successive RACH slots. The uplink-access latency can be reduced to the desired target latency by allocating an appropriate number of UL polling channels between adjacent RACH slots in the cluster set. Reducing the uplink-access latency may be enabled by performing the UL polling channel insertion procedure, described in more detail below.

According to certain embodiments of the present invention, with regard to performing a UL polling channel insertion procedure, suppose $C_s=\{AP_0, AP_1, \ldots, AP_{N-1}\}$, where Cs corresponds to the cluster set of a user device UD (containing N APs).

Suppose $U_{alloc}=(T_0^{i_0}, T_1^{i_1}, \ldots, T_j^{i_j}, \ldots T_{p-1}^{i_{p-1}})$, $T_{j-1}^{i_{j-1}} < T_j^{i_j}$ for $0 \leq j \leq p$, corresponds to the sequential time instants of uplink access opportunities for the UD over its RACH period $T_{RACH}$, where $T_j^{i_j}$ denotes that an uplink access channel, which can be an uplink polling channel or an uplink random access channel (RACH), is available for the UD in the access point $AP_{i_j}$ ($0 \leq i_j < N$) at time $T_j^{i_j}$. This sequence $U_{alloc}$ may be repeated with the periodicity $T_{RACH}$. Thus, an infinite sequence may exist where $T_{p+j}^{i_{p+j}} = T_j^{i_j}$, $j \geq 0$.

An uplink access channel allocation is considered "m-blockage-safe" if the UD can overcome blockages of up to m ($0 \leq m < N$) APs in at most m+1 consecutive uplink access attempts. For an allocation $U_{alloc}=(T_0^{i_0}, T_1^{i_1}, \ldots, T_j^{i_j}, \ldots T_{p-1}^{i_{p-1}})$ to be "m-blockage-safe," the necessary and sufficient condition is: for any j, the elements in $\{i_j, i_{j+1}, \ldots, i_{j+m}\}$ (where $i_k$, k=j, j+1, ..., j+m, denotes the index of the AP to which the uplink access channel at the instant $T_k^{i_k}$ has been allocated) are all distinct. This condition ensures that, any m+1 consecutive uplink access channel allocations for an UD occur in m+1 distinct APs. Thus, in case m APs in the cluster set of the UD are blocked, the UD will be able to perform a successful uplink access in at most m+1 attempts. As an illustration, assume there are 4 APs ($AP_0, AP_1, AP_2$ and $AP_3$) in the cluster set of an UD and the sequence of APs to which uplink access channels are allocated is: $AP_0, AP_1, AP_2, AP_3, AP_0, AP_1, AP_2, AP_3, AP_0, AP_1, \ldots$ (which is a repeated sequence with a periodicity of 4). Then this allocation is 3-blockage safe, because any sub-sequence of length 4 of the above allocation sequence has 4 distinct APs. Thus, if the UD attempts an uplink access with $AP_0$, and $AP_0, AP_1$ and $AP_2$ are all blocked, then UD will be successful in uplink access with $AP_3$, which is next in the sequence. It can be observed that, the above allocation is also 1-blockage-safe and 2-blockage-safe. Because, in practical deployment scenarios, the probability of simultaneous radio link blockages of multiple APs is small, a system designed in accordance with small values of m may be sufficiently robust. For illustrative purposes, suppose 0<m≤2. In the following, the insertion procedure for N≥3 is described.

For N≥3, a new uplink access channel, $T_k^{i_k}$, can be allocated that maintains the 1-blockage-safe property between $T_j^{i_j}$ and $T_{j+1}^{i_{j+1}}$ by selecting an access point $AP_{i_k}$, where $i_k \in \{0, 1, \ldots N-1\} = \{i_j, i_{j+1}\}$ (assuming that the allocation was already satisfying the "1-blockage-safe property" prior to this insertion). For N≥3, a new uplink access channel, $T_k^{i_k}$, can be allocated that maintains the 2-blockage-safe property between $T_j^{i_j}$ and $T_{j+1}^{i_{j+1}}$ by selecting an access point $AP_{i_k}$ as follows.

In a first case, the set $\{0, 1, \ldots N-1\} - \{i_{j-1}, i_j, i_{j+1}, i_{j+2}\}$ may be non-empty. With this first case, the method may include selecting an $i_k \in \{0, 1, \ldots N-1\} - \{i_{j-1}, i_j, i_{j+1}, i_{j+2}\}$. This selection may ensure compliance of the 2-blockage-safe property. If there are multiple choices, the method may include selecting the access point which has been used the least number of times in the $T_{RACH}$ period. In a second case, the set $\{0, 1, \ldots N-1\} - \{i_{j-1}, i_j, i_{j+1}, i_{j+2}\}$ may be empty. With this second case, the method may include selecting an $i_k \in \{0, 1, \ldots N-1\} - \{i_j, i_{j+1}\}$. If there are multiple choices, the method may include selecting the access point which has been used the least in the $T_{RACH}$ period.

In one example, assume that $i_k = i_{j-1}$. After this allocation, the partial sequence becomes $(T_{j-1}^{i_{j-1}}, T_j^{i_j}, T_k^{i_{j-1}}, T_{j+1}^{i_{j+1}}, T_{j+2}^{i_{j+2}})$. With this selection, the 1-blockage-safe property may still be satisfied, but the 2-blockage-safe property may be violated. In this scenario, the 2-blockage-safe property can be restored by allocating a standby uplink polling channel at the allocated instants where this property is violated.

A standby allocation may be required for an allocation at the instant $T_l^{i_l}$ in the resulting sequence, if $i_l = i_{l-2}$. The standby allocation $T_l^{s_l}$ may be performed in access point $AP_{s_l}$, where $s_l \in \{0, 1, \ldots N-1\} - \{i_l, i_{l-1}\}$. For the UD, if the UL data arrives at the queue in the interval $[T_{l-3}^{i_{l-3}}, T_{l-2}^{i_{l-2}})$, and the UD detects that both $AP_{i_{l-2}}$ and $AP_{i_l}$ are blocked, then the UD may use the standby allocation $T_l^{s_l}$ (instead of $T_l^{i_l}$) as the next uplink access channel.

After an insertion of a UL polling channel, some of the previously-allocated standby UL access channels may no longer be required to maintain the 2-blockage-safe property, and, hence, the previously-allocated standby UL access channels can be de-allocated. This can be achieved by executing the following two steps after each insertion of a UL polling channel One step may include removing all standby UL polling channel allocations, if there are any. A second step of the method may include, in the uplink access allocation sequence $U_{alloc}$, allocating a standby polling channel at an uplink access instance $T_l^{i_l}$, 2-blockage-safe property is violated at $T_l^{i_l}$.

Figure 10:
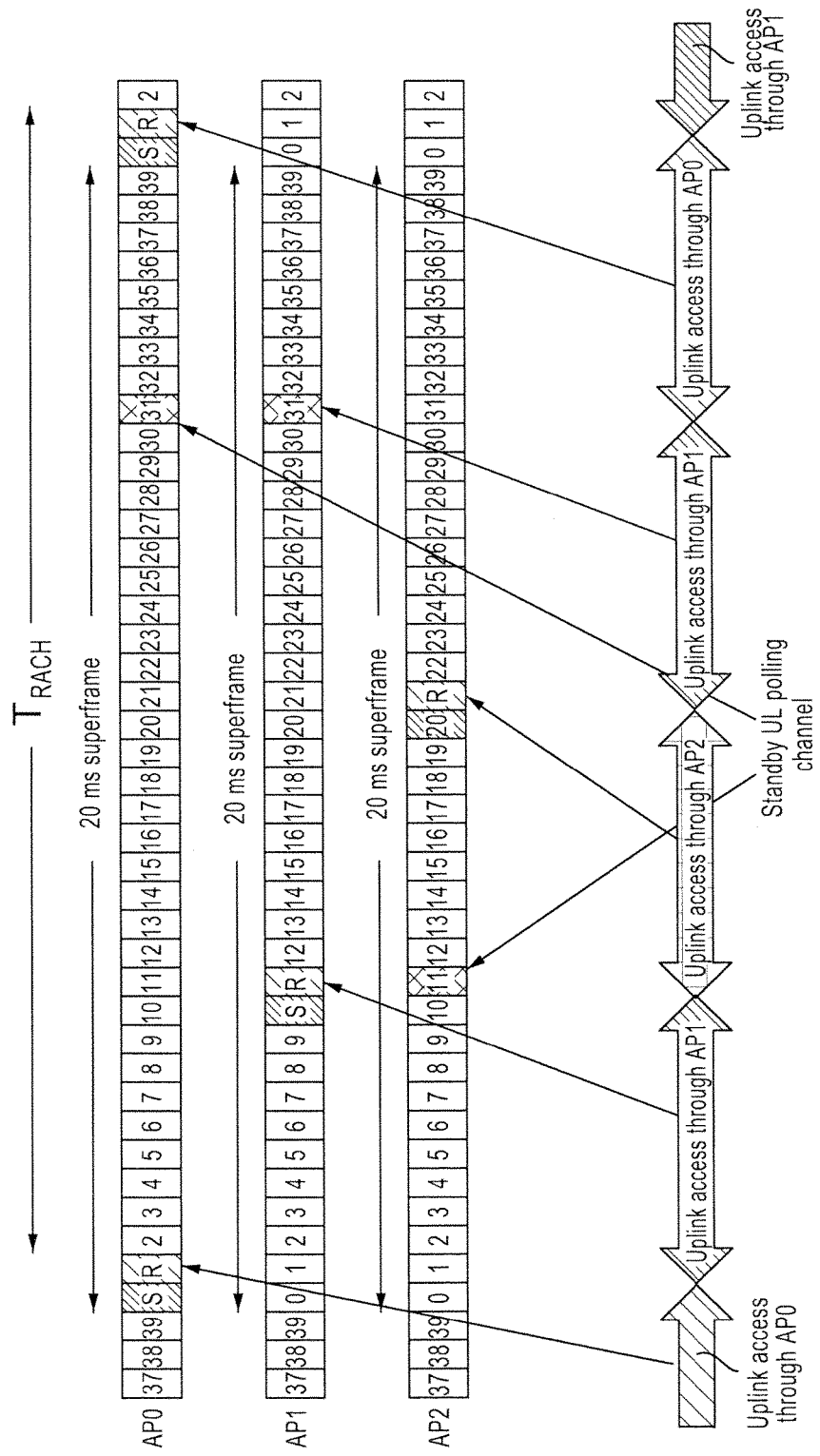
FIG. 10 illustrates an example uplink access channel allocation in accordance with certain embodiments of the present invention.

In the event of irregular uplink access intervals, as shown in FIG. 6, the target uplink access latency can be achieved by inserting an UL polling channel after the RACH slot of AP2, and before the RACH slot of AP0, using the insertion procedure described above. After the insertion of the UL polling channel, the UL access channel allocations are shown in FIG. 10. Two standby UL polling channels have been allocated to ensure the 2-blockage-safe property.

Figure 12:
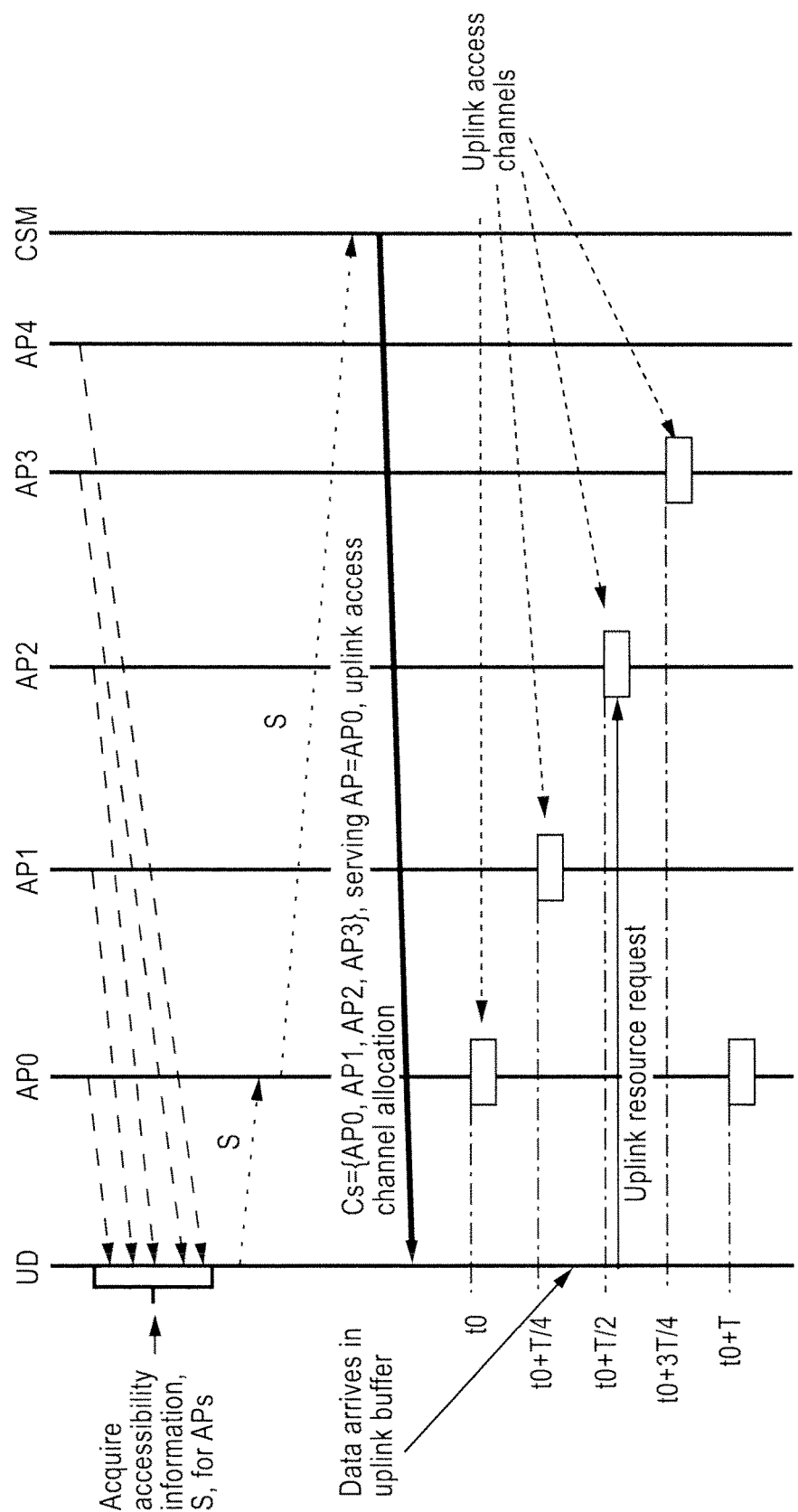
FIG. 12 illustrates using a cluster-set configuration to perform uplink access procedures, in accordance with certain embodiments of the present invention.

FIG. 12 illustrates using a cluster-set configuration to perform uplink access procedures, in accordance with certain embodiments of the present invention. With regard to the uplink access procedure of FIG. 12, when the UD accesses the uplink (after new data arrives in the uplink buffer), the following steps may be performed. With a first step, the UD may determine the AP (in the UD's cluster set) whose uplink access channel occurs next earliest in time. This AP may be designated as the UL-AP. With a second step, the UD may select the best beam configuration for communication with the UL-AP, and the UD may transmit the uplink-access request over the selected beam configuration over the uplink access channel of the UL-AP. With a third step, if the UD receives a response from the UL-AP indicating a successful random access, the UD will continue with the uplink data transfer procedure. With a fourth step, if the UD does not receive a response from the UL-AP, the UD determines that the uplink access attempt has failed. The UD may repeat the above-described steps of the uplink-access procedure.

Figure 13:
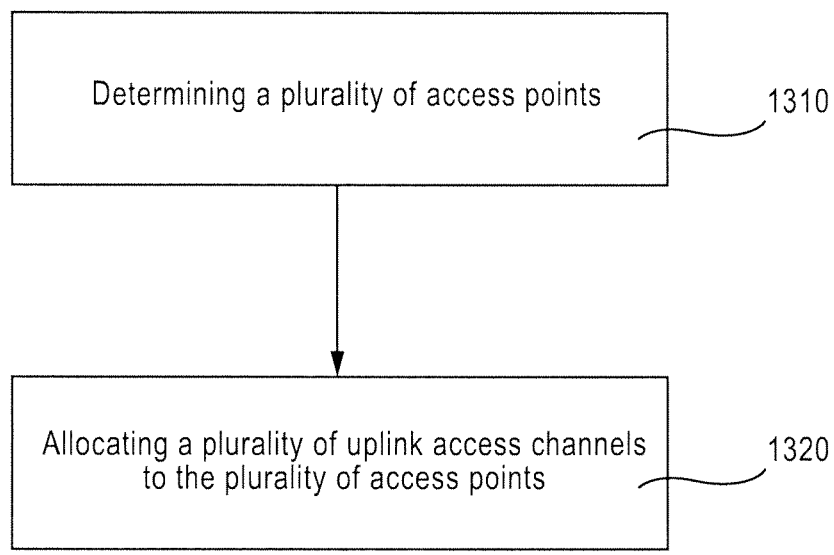
FIG. 13 illustrates a flowchart of a method in accordance with embodiments of the invention.

FIG. 13 illustrates a flowchart of a method in accordance with embodiments of the invention. The method illustrated in FIG. 13 includes, at 1310, determining, by a network element, a plurality of access points. In certain embodiments of the present invention, the plurality of access points may be configured as shown by FIG. 11. The plurality of access points belong to a cluster set of a user device. The method includes, at 1320, allocating a plurality of uplink access channels to the plurality of access points. The plurality of uplink access channels comprise uplink polling channels. The plurality of uplink access channels are allocated such that the plurality of access channels are staggered in time within a frame structure used by the plurality of access points and the user device.

Figure 14:
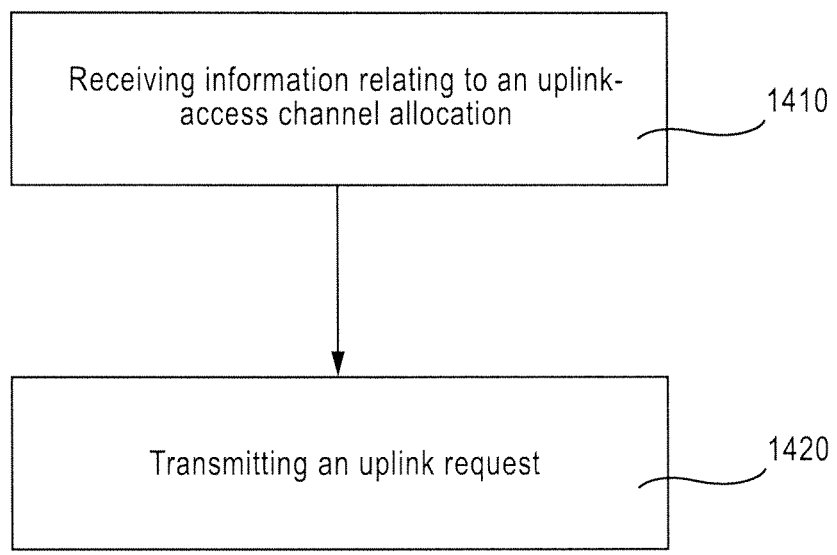
FIG. 14 illustrates a flowchart of a method in accordance with embodiments of the invention.

FIG. 14 illustrates a flowchart of a method in accordance with embodiments of the invention. The method illustrated in FIG. 14 includes, at 1410, receiving information relating to an uplink-access channel allocation that has been allocated to a plurality of access points. In certain embodiments of the present invention, the plurality of access points may be configured as shown by FIG. 11. The uplink-access channel allocation comprises an allocation of uplink polling channels. The plurality of access points belong to a cluster set of the user device. The method may also include, at 1420, transmitting an uplink request via an earliest uplink-access channel allocation after arrival of data in an uplink queue of the user device.

Figure 15:
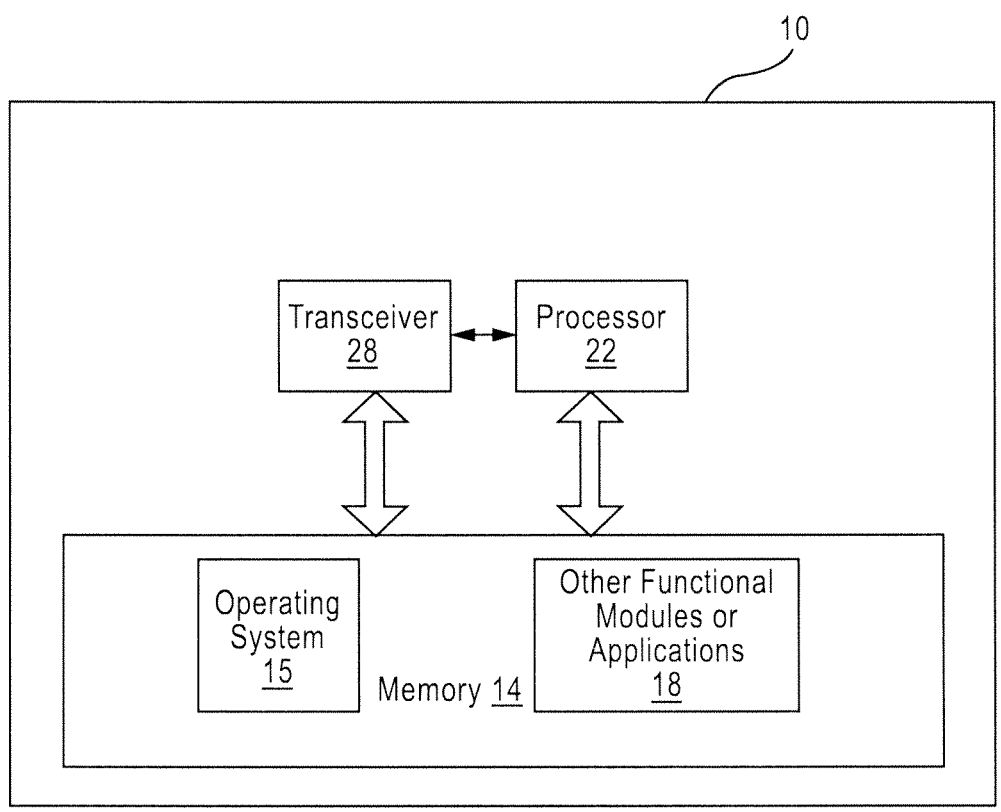
FIG. 15 illustrates an apparatus in accordance with embodiments of the invention.

FIG. 15 illustrates an apparatus in accordance with embodiments of the invention. In one embodiment, the apparatus can be a network element, such as a user device, an uplink-access channel configurator, an access point, and/or a cluster-set manager, for example. Apparatus 10 can include a processor 22 for processing information and executing instructions or operations. Processor 22 can be any type of general or specific purpose processor. While a single processor 22 is shown in FIG. 15, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 16:
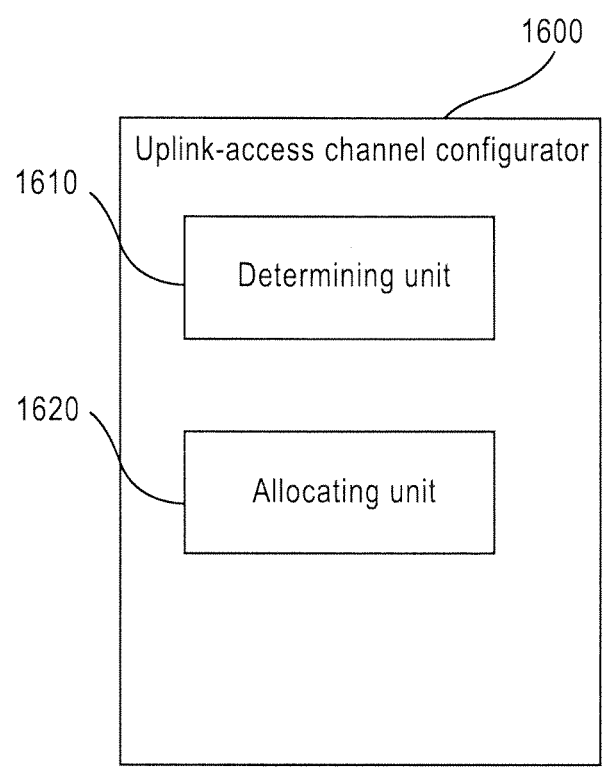
FIG. 16 illustrates an apparatus in accordance with embodiments of the invention.

FIG. 16 illustrates an apparatus in accordance with embodiments of the invention. Apparatus 1600 can be a network element/entity such as an uplink-access channel configurator, for example. Apparatus 1600 can include a determining unit 1610 that determines a plurality of access points. The plurality of access points belong to a cluster set of a user device. Apparatus 1600 may also include an allocating unit 1620 that allocates a plurality of uplink access channels to the plurality of access points. The plurality of uplink access channels comprise uplink polling channels. The plurality of uplink access channels are allocated such that the plurality of uplink access channels are staggered in time within a frame structure used by the plurality of access points and the user device.

Figure 17:
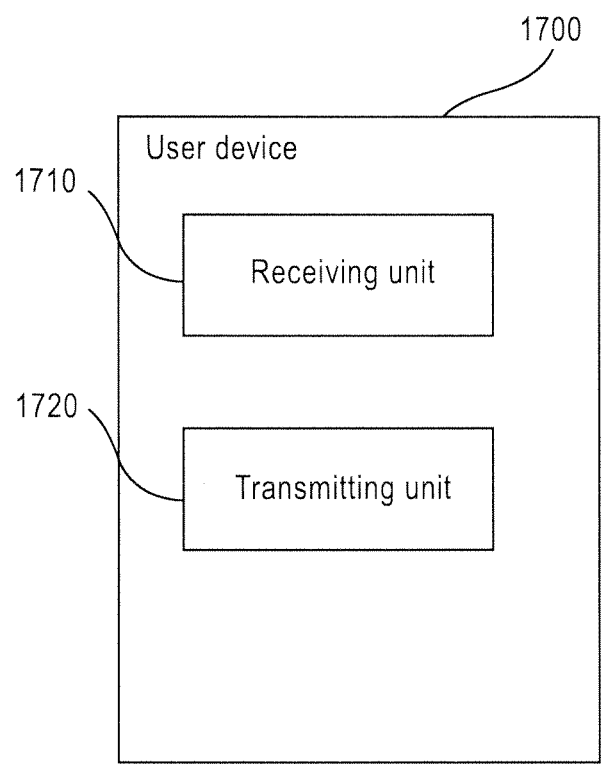
FIG. 17 illustrates an apparatus in accordance with embodiments of the invention.

FIG. 17 illustrates an apparatus in accordance with embodiments of the invention. Apparatus 1700 can be a network element/entity such as a user device, for example. Apparatus 1700 can include a receiving unit 1710 that receives information relating to an uplink-access channel allocation that has been allocated to a plurality of access points. The uplink-access channel allocation comprises an allocation of uplink polling channels. The plurality of access points belong to a cluster set of the user device. Apparatus 1700 may include a transmitting unit 1720 that transmits an uplink request via an earliest uplink-access channel allocation after arrival of data in an uplink queue of the user device.

Figure 18:
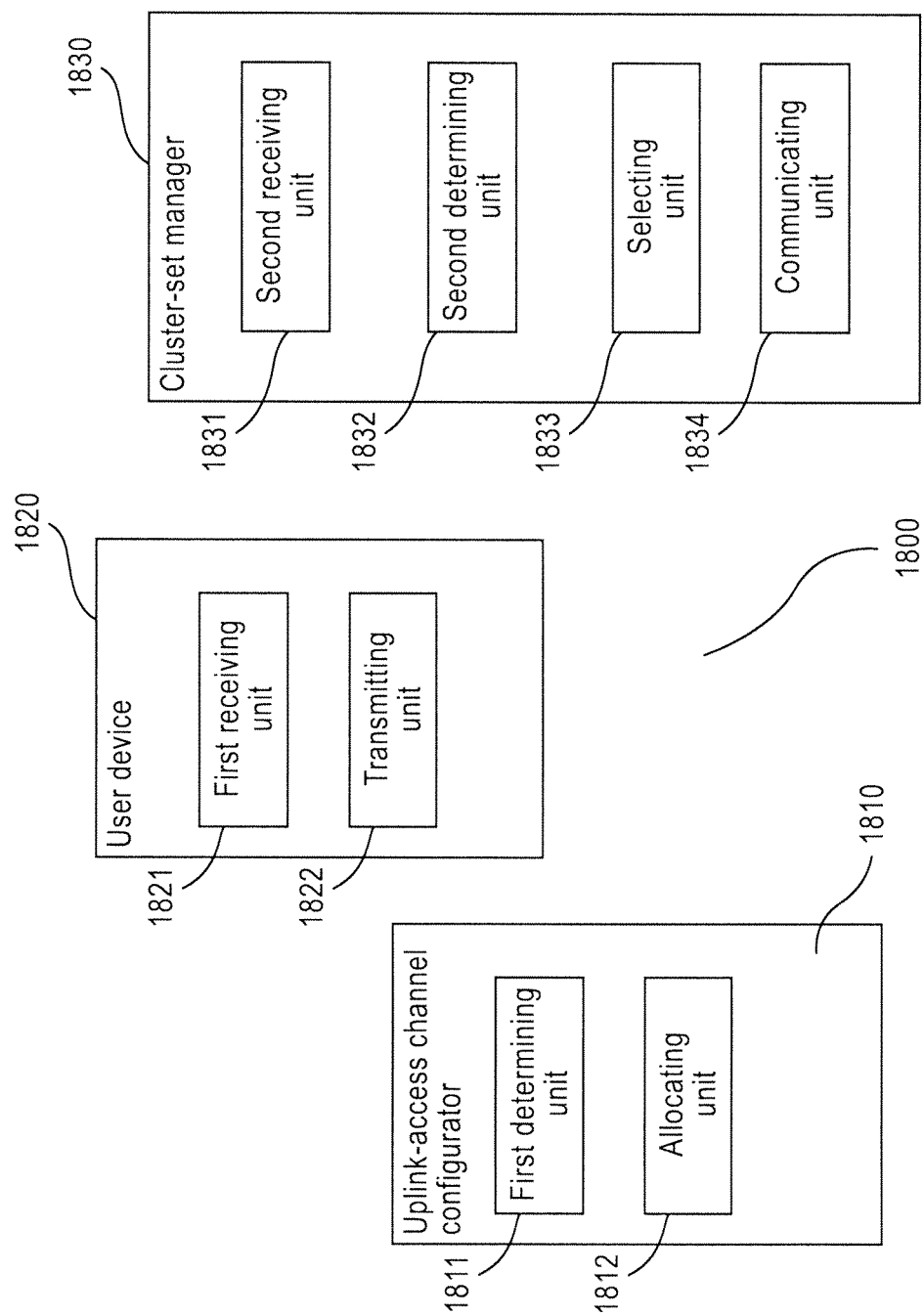
FIG. 18 illustrates a system in accordance with embodiments of the invention.

FIG. 18 illustrates a system 1800 in accordance with embodiments of the invention. System 1800 includes at least a first apparatus 1810. First apparatus 1810 may be a network element/entity such as an uplink-access channel configurator, for example. First apparatus 1810 can include a first determining unit 1811 that determines a plurality of access points. The plurality of access points belong to a cluster set of a user device. First apparatus 1810 may also include an allocating unit 1812 that allocates a plurality of uplink access channels to the plurality of access points. The plurality of uplink access channels comprise uplink polling channels. The plurality of uplink access channels are allocated such that the plurality of uplink access channels are staggered in time within a frame structure used by the plurality of access points and the user device.

System 1800 may also include at least a second apparatus 1820. Second apparatus 1820 can be a network element/entity such as a user device, for example. Second apparatus 1820 can include a first receiving unit 1821 that receives information relating to an uplink-access channel allocation that has been allocated to a plurality of access points. The uplink-access channel allocation comprises an allocation of uplink polling channels. The plurality of access points belong to a cluster set of the user device. Second apparatus 1820 may include a transmitting unit 1822 that transmits an uplink request via an earliest uplink-access channel allocation after arrival of data in an uplink queue of the user device.

System 1800 may also include at least a third apparatus 1830. Third apparatus 1830 can be a network element/entity such as cluster-set manager, for example. Third apparatus 1830 may include a second receiving unit 1831 that receives accessibility information relating to a plurality of access points from a user device. Third apparatus 1830 may also include a second determining unit 1832 that determines a cluster set for the user device based on received accessibility information. Third apparatus 1830 may also include a selecting unit 1833 that selects a serving access point for the user device. Third apparatus 1830 may also include a communicating unit 1834 that communicates the determined cluster set and the serving access point to the user device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining, by a network element, a plurality of access points, wherein the plurality of access points belong to a cluster set of a user device; and
   allocating a plurality of uplink access channels to the plurality of access points, wherein allocating the plurality of uplink access channels comprises interleaving a user-specific dedicated uplink polling channel between adjacent random-access-channel slots, and wherein the plurality of uplink access channels are allocated such that the plurality of uplink access channels are staggered in time within a frame structure used by the plurality of access points and the user device.

2. The method according to claim 1, wherein the frame structure comprises a 5G mmWave frame structure.

3. The method according to claim 1, wherein the allocating the plurality of uplink access channels to be staggered in time comprises allocating the uplink access channels to correspond to different times.

4. The method according to claim 1, wherein the determining the plurality of access points comprises determining by an uplink-access channel configurator.

5. The method according to claim 1, wherein the allocating the plurality of uplink access channels comprises performing an allocation satisfying an m-blockage safe property, and the m-blockage safe property corresponds to a property where the user device can overcome blockages of up to m access points in at most m+1 consecutive uplink access attempts.

6. A method, comprising:
determining, by a network element, a plurality of access points, wherein the plurality of access points belong to a cluster set of a user device; and
allocating a plurality of uplink access channels to the plurality of access points, wherein the plurality of uplink access channels comprise uplink polling channels, and the plurality of uplink access channels are allocated such that the plurality of uplink access channels are staggered in time within a frame structure used by the plurality of access points and the user device, wherein the allocating of the plurality of uplink access channels comprises performing a standby allocation in one of the plurality of the access points at a time instant $T_l$ in a resulting sequence comprising successive allocations at time instants $T_{l-2}$, $T_{l-1}$, $T_l$ in the access points having indices $i_{l-2}$, $i_{l-1}$, $i_l$, respectively, where $i_{l-2}$ does not equal $i_{l-1}$ and $i_l$ equals $i_{l-2}$, and the standby allocation at time instant $T_l$ is performed in another of the plurality of access points $AP_{s_l}$, where $s_l \in \{0, 1, \ldots N-1\} - \{i_l, i_{l-1}\}$, $s_l$ being an index for the another of the plurality of access points, N being a total number of access points in the plurality of access points, $\{0, 1, \ldots N-1\}$ being a set of indices of the plurality of access points, and $i_{l-1}$ being an index of one of the plurality of access points to which one of the uplink access channels have been allocated, where $s_l$ is different than $i_{l-1}$ and $i_{l-2}$.

7. An apparatus, comprising:
at least one processor; and
at least one memory including computer program code, the at least one memory and the computer program code are configured, with the at least one processor, to cause the apparatus at least to:
determine a plurality of access points, wherein the plurality of access points belong to a cluster set of a user device; and
allocate a plurality of uplink access channels to the plurality of access points, wherein allocating the plurality of uplink access channels comprises interleaving a user-specific dedicated uplink polling channel between adjacent random-access-channel slots, and wherein the plurality of uplink access channels are allocated such that the plurality of uplink access channels are staggered in time within a frame structure used by the plurality of access points and the user device.

8. The apparatus according to claim 7, wherein the frame structure comprises a 5G mmWave frame structure.

9. The apparatus according to claim 7, wherein the allocating the plurality of uplink access channels to be staggered in time comprises allocating the uplink access channels to correspond to different times.

10. The apparatus according to claim 7, wherein the determining the plurality of access points comprises determining by an uplink-access channel configurator.

11. The apparatus according to claim 7, wherein the allocating the plurality of uplink access channels comprises performing an allocation satisfying an m-blockage safe property, and the m-blockage safe property corresponds to a property where the user device can overcome blockages of up to m access points in at most m+1 consecutive uplink access attempts.

12. A computer program product, embodied on a non-transitory computer readable medium, the computer program product configured to control a processor to perform the method of claim 1.

13. An apparatus, comprising:
at least one processor; and
at least one memory including computer program code, the at least one memory and the computer program code configured, with the at least one processor, to cause the apparatus at least to
determining a plurality of access points, wherein the plurality of access points belong to a cluster set of a user device; and
allocating a plurality of uplink access channels to the plurality of access points, wherein the plurality of uplink access channels comprise uplink polling channels, and the plurality of uplink access channels are allocated such that the plurality of uplink access channels are staggered in time within a frame structure used by the plurality of access points and the user device, wherein the allocating of the plurality of uplink access channels comprises performing a standby allocation in one of the plurality of the access points at a time instant $T_l$ in a resulting sequence comprising successive allocations at time instants $T_{l-2}$, $T_{l-1}$, $T_l$ in the access points having indices $i_{l-2}$, $i_{l-1}$, $i_l$, respectively, where $i_{l-2}$ does not equal $i_{l-1}$, and $i_l$ equals $i_{l-2}$, and the standby allocation at time instant $T_l$ is performed in another of the plurality of access points $AP_{s_l}$, where $s_l \in \{0, 1, \ldots N-1\} - \{i_l, i_{l-1}\}$, $s_l$ being an index for the another of the plurality of access points, N being a total number of access points in the plurality of access points, $\{0, 1, \ldots N-1\}$ being a set of indices of the plurality of access points, and $i_{l-1}$ being an index of one of the plurality of access points to which one of the uplink access channels have been allocated, where $s_l$ is different than $i_{l-1}$ and $i_{l-2}$.

14. A method, comprising:
receiving, by a user device, information relating to an uplink-access channel allocation that has been allocated to a plurality of access points, wherein the uplink-access channel allocation comprises an allocation of a user-specific dedicated uplink polling channel interleaved between adjacent random-access-channel slots, and wherein the plurality of access points belong to a cluster set of the user device; and
transmitting an uplink request via an earliest uplink-access channel allocation after arrival of data in an uplink queue of the user device.

15. The method in claim 14, wherein the transmitting the uplink request comprises transmitting via an earliest uplink access channel which is an uplink polling channel.

16. The method in claim 14, wherein the transmitting the uplink request comprises transmitting via an earliest uplink access channel which is a Random-Access-Channel.

17. The method of claim 14, further comprising configuring the transmitting to use the best beam for transmitting the uplink request.

18. An apparatus, comprising:
at least one processor; and
at least one memory including computer program code,
the at least one memory and the computer program code are configured, with the at least one processor, to cause the apparatus at least to:
receive information relating to an uplink-access channel allocation that has been allocated to a plurality of access points, wherein the uplink-access channel allocation comprises an allocation of a user-specific dedicated uplink polling channel interleaved between adjacent random-access-channel slots, and wherein the plurality of access points belong to a cluster set of the apparatus; and
transmit an uplink request via an earliest uplink-access channel allocation after arrival of data in an uplink queue of the apparatus.

19. The apparatus according to claim 18, wherein the transmitting the uplink request comprises transmitting via an earliest uplink access channel which is an uplink polling channel.

20. The apparatus according to claim 18, wherein the transmitting the uplink request comprises transmitting via an earliest uplink access channel which is a Random-Access-Channel.

21. The apparatus according to claim 18, wherein the apparatus is further caused to configure the transmitting to use the best beam for transmitting the uplink request.

22. A computer program product, embodied on a non-transitory computer readable medium, the computer program product configured to control a processor to perform the method of claim 14.

* * * * *